United States Patent
Wu

(10) Patent No.: US 12,149,299 B2
(45) Date of Patent: *Nov. 19, 2024

(54) SYNCHRONIZED MULTI-CHANNEL ACCESS SYSTEM

(71) Applicant: ENTROPIC COMMUNICATIONS, LLC, New York, NY (US)

(72) Inventor: Zong Wu, San Diego, CA (US)

(73) Assignee: ENTROPIC COMMUNICATIONS, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,942

(22) Filed: Aug. 3, 2023

(65) Prior Publication Data

US 2023/0387963 A1 Nov. 30, 2023

Related U.S. Application Data

(63) Continuation of application No. 17/395,904, filed on Aug. 6, 2021, now Pat. No. 11,750,241, which is a
(Continued)

(51) Int. Cl.
*H04L 45/24* (2022.01)
*H04B 3/04* (2006.01)
(Continued)

(52) U.S. Cl.
CPC ............ *H04B 3/04* (2013.01); *H04L 12/2898* (2013.01); *H04L 45/24* (2013.01); *H04L 47/125* (2013.01); *H04L 47/50* (2013.01)

(58) Field of Classification Search
CPC ....... H04B 3/04; H04L 12/2898; H04L 45/24; H04L 47/125; H04L 47/50
See application file for complete search history.

(56) References Cited

U.S. PATENT DOCUMENTS

| 8,483,152 B1 | 7/2013 | Mueller |
| 8,498,294 B1 | 7/2013 | Monk et al. |

(Continued)

FOREIGN PATENT DOCUMENTS

EP  1 357 705  10/2003

OTHER PUBLICATIONS

International Search Report corresponding to International Patent Application No. PCT/US2014/023639 mailed Jul. 28, 2014, (4 pages).

(Continued)

*Primary Examiner* — Michael J Moore, Jr.
*Assistant Examiner* — Prenell P Jones
(74) *Attorney, Agent, or Firm* — Hao Tan; Zhangyuan Ji

(57) ABSTRACT

Systems and methods are provided for synchronizing multiple channels in an access network, where the multiple channels are neighboring channels such that a guard band between them or use of a diplexer to prevent inter-channel interference is not required. Synchronization is achieved by defining channel MAP (media access plan) cycle structures such that all channels work in the same direction (upstream US or downstream DS) at any given time. Moreover, the network controller of channel may send out a beacon to allow new nodes to join. A long MAP cycle (402) may be followed by three consecutive regular MAP cycles (404, 406), and (408). These MAP cycles are repeated between beacon transmissions. Synchronization allows multiple channels to be configured contiguous (without a guard band between neighbouring channels) and without utilizing diplexers. A plurality of customer premises equipment may operate on each of the communications channels.

20 Claims, 9 Drawing Sheets

Related U.S. Application Data continuation of application No. 17/131,295, filed on Dec. 22, 2020, now abandoned, which is a continuation of application No. 16/877,045, filed on May 18, 2020, now abandoned, which is a continuation of application No. 16/161,466, filed on Oct. 16, 2018, now Pat. No. 10,659,103, which is a continuation of application No. 14/774,845, filed as application No. PCT/US2014/023639 on Mar. 11, 2014, now Pat. No. 10,103,776.

(60) Provisional application No. 61/776,604, filed on Mar. 11, 2013.

(51) Int. Cl.
*H04L 12/28* (2006.01)
*H04L 47/125* (2022.01)
*H04L 47/50* (2022.01)

(56) References Cited

U.S. PATENT DOCUMENTS

| | | |
|---|---|---|
| 2003/0063567 A1 | 4/2003 | Dehart |
| 2003/0086515 A1 | 5/2003 | Trans et al. |
| 2004/0163129 A1 | 8/2004 | Chapman et al. |
| 2005/0186933 A1 | 8/2005 | Trans |
| 2006/0126580 A1 | 6/2006 | Katsumata et al. |
| 2008/0151790 A1 | 6/2008 | Lee et al. |
| 2008/0209489 A1 | 8/2008 | Joyce et al. |
| 2009/0092154 A1 | 4/2009 | Malik et al. |
| 2009/0296865 A1 | 12/2009 | Ashikhmin et al. |
| 2009/0310486 A1* | 12/2009 | Sandstrom ............ H04L 47/525 370/235 |
| 2010/0082791 A1 | 4/2010 | Liu et al. |
| 2010/0098110 A1 | 4/2010 | Mueller |
| 2010/0142540 A1 | 6/2010 | Matheney et al. |
| 2011/0218687 A1 | 9/2011 | Hadar et al. |
| 2012/0287866 A1 | 11/2012 | Petrovic et al. |
| 2013/0128995 A1 | 5/2013 | Mittelstadt et al. |
| 2013/0208579 A1 | 8/2013 | Strobel et al. |
| 2013/0236177 A1 | 9/2013 | Fang et al. |
| 2014/0133858 A1 | 5/2014 | Fang et al. |
| 2014/0192803 A1 | 7/2014 | Malik et al. |

OTHER PUBLICATIONS

International Preliminary Report and Written Opinion for PCT Patent Application No. PCT/2014/023639 dated Sep. 24, 2015, (10 pages).

\* cited by examiner

SYNCHRONIZED MULTI-CHANNEL ACCESS SYSTEM

CROSS-REFERENCE TO RELATED APPLICATIONS/INCORPORATION BY REFERENCE

This patent application is a continuation of U.S. patent application Ser. No. 17/131,295, filed Dec. 22, 2020, now abandoned which is a continuation of U.S. patent application Ser. No. 16/877,045, filed May 18, 2020, now abandoned which is a continuation of U.S. patent application Ser. No. 16/161,466, filed on Oct. 16, 2018, now U.S. Pat. No. 10,659,103; which is a continuation of U.S. patent application Ser. No. 14/774,845, filed Sep. 11, 2015, now U.S. Pat. No. 10,103,776; which is a 371 filing of application serial no. PCT/US2014/023639, filed Mar. 11, 2014, which claims priority to U.S. Provisional Application No. 61/776,604, filed Mar. 11, 2013; each of which is hereby incorporated herein by reference in its entirety.

TECHNICAL FIELD

The present disclosure relates generally to communication networks. In particular, some embodiments provide systems and methods for synchronizing multiple channels and minimizing interference therebetween without a guard band separating the multiple channels.

BACKGROUND

An increasing use of communications networks is for content delivery to customer premises by service providers. For example, service providers may operate hybrid Passive Optical Network (PON) and coaxial/coax network. The c.LINK Access networks derived from the MoCA (Multimedia over Coax Alliance) technology are one type of network used for such content delivery system. FIG. 1 illustrates an example of a network topology for an access network. In this network, a network controller 101 is in communication with a plurality of network nodes 103. For example, network controller 101 may be an access network controller (NC) (sometimes referred to as a Network Coordinator) managed by an Operator/Service Provider (OSP) or Multiple System Operator (MSO), such as a cable company. Network nodes 103 may comprise various Customer Premise Equipment (CPEs), such as televisions, computers, high-speed data modems, set-top boxes, or other network connected content delivery systems.

Such an access network may be arranged in a point-to-multipoint topology 102. In point-to-multipoint topology 102, network nodes 103 communicate with NC 101 and NC 101 communicates with each network node 103, but network nodes 103 may not necessarily communicate with each other. In access networks like c.LINK, hundreds of CPEs can be in communication with a single NC. Other implementations of the coax-based technologies involve in-home networks (HNs) similar to the MoCA standard. MoCA HNs use mesh topologies with multipoint-to-multipoint topologies, where multiple nodes can communicate with a plurality of other nodes. MoCA HNs are usually 16 nodes or fewer, including the NC.

In an access network, downstream (DS) traffic is transmitted from an NC to one, some, or all of the CPEs. Upstream (US) traffic is transmitted from CPEs to the NC. Upstream traffic is generally transmitted one CPE at a time (sometimes referred to as upstream bursts). When an NC has information (sometimes referred to as "packets," or "datagrams") to send to CPEs, it can simply schedule and transmit such downstream traffic. Accordingly, little or no preparation and interaction is required between the NC and (destination) network nodes (or CPEs). However, upstream bursts require more preparation and interaction between network nodes and the NC in order for the NC to schedule traffic properly. Packets that originate at the CPE are destined for the NC (e.g., for processing by the NC, for relay onto the Internet, etc.) When a CPE has data to send, the CPE must inform the NC and wait for an upstream transfer to be scheduled.

In c.LINK and MoCA networks, access to the medium is controlled by the NC. The NC divides the transmission time into units referred to as Media Access Plan (MAP) cycles, and the NC further schedules transmission during the MAP cycles. FIG. 2 illustrates examples of such MAP cycles 203, 205. Each MAP cycle 203, 205 is divided into time slots. During each MAP cycle 203, 205, an NC may transmit a MAP packet 201, 202 that provides a schedule to all the network nodes indicating when, within the next MAP cycle, each packet (including the next MAP packet 202) will be sent. Networks may apply other scheduling methods as well. For example, the NC may send individual (e.g., unicast) grants to each network node or CPE.

FIG. 2 is also representative of a timing diagram that illustrates the timing relationship between MAPs 201, 202 and MAP cycles 203, 205. MAP 201 indicates the allocation of time slots within MAP cycle 205. Accordingly, each MAP schedules the communication activity for the next MAP cycle (including all communications between the NC and the network nodes). Only one such "next MAP cycle" 205 is shown in FIG. 2, however, it should be understood that in various implementations, MAP 202 schedules all communications for the next MAP cycle (not shown) that follows MAP cycle 205.

Reservation requests (RRs) 207, 209, 211 are one particular type of packet that MAPs 201, 202 are responsible for scheduling. Six such RRs are shown in first MAP cycle 203 of FIG. 2, starting with first RR 207 and ending with last RR 209. One RR 211 is shown in the second MAP cycle 205. Each RR may be sent from one network node 103. Each RR 207, 209 may contain one or more Reservation Request Elements (RREs). Each RRE communicates a desire on the part of a network node 103 from which an RR 207, 209 was sent to transmit one MoCA packet. Each RR 207, 209 allows a network node 103 to communicate to NC 101 that network node 103 has data packets it wishes to send. Furthermore, each RR 207, 209 indicates the packet length (from which the packet duration can be determined), packet priority, Flow ID and so on for those data packets. The NC uses this information to schedule "transmission slots" during which a network node can transmit those data packets it wishes to send. The NC 101 then communicates that schedule by generating and transmitting a MAP, e.g., MAP 201, which includes transmission slot assignments for next MAP cycle 205.

During a "data packet transmission phase," an RR is either "granted" (i.e., scheduled) or discarded by the NC. The RR is granted depending on whether there is sufficient network bandwidth to service the request. It should be noted that for the purpose of this description, "granted" means that an NC assigns a transmission slot to the packet associated with an RR to allow the network node that generated the request to transmit the associated packet during the assigned transmission slot in a next MAP cycle. The NC then transmits a MAP to indicate the schedule to all of the network nodes of the network, including the requesting node. Each requesting node then transmits the packets in a MAC cycle according to the schedule indicated by the MAP. Hence, a CPE can inform the NC (or other such scheduler) when it has traffic to send (US).

SUMMARY

In accordance with one embodiment, a synchronized multi-channel access headend platform comprises a host processor and a plurality of network controllers. Each of the plurality of network controllers is associated with a communications channel. The host processor synchronizes upstream and downstream operation of each of the communications channels, the communications channels occupying neighboring non-guard band separated frequency bands, by at least one of reading/writing control messages from/to the plurality of network controllers through at least one of an Ethernet switch operatively connected to the host processor via an Ethernet interface and a Media Independent Interface Management Interface.

In accordance with another embodiment, a method of synchronizing multiple channels of an access network, comprises defining a Media Access Plan cycle for a for each of a plurality of access network channels. The MAP cycle for each of the plurality of access network channels is divided into an upstream cycle and a downstream cycle. The MAP cycles of each of the plurality of access network channels are synchronized, the plurality of access network channels occupying neighboring non-guard band separated frequency bands.

In accordance with still another embodiment, a method of synchronizing multiple channels of an access network, comprises defining a Media Access Plan cycle for each access network channel of the access network. The MAP cycle for each access network channel is divided into an upstream cycle and a downstream cycle. The MAP cycles and beacon cycles of each access network channel are synchronized with that of the first access network channel, such that transmission of upstream traffic of each access network channel occurs during the upstream cycle and transmission of downstream traffic of each access network channel occurs during the downstream cycle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

Various embodiments are described in detail with reference to the following figures. The drawings are provided for purposes of illustration only and merely depict typical or example embodiments. These drawings are provided to facilitate the reader's understanding and shall not be considered limiting of the breadth, scope, or applicability of the invention. It should be noted that for clarity and ease of illustration these drawings are not necessarily made to scale.

Figure 1:
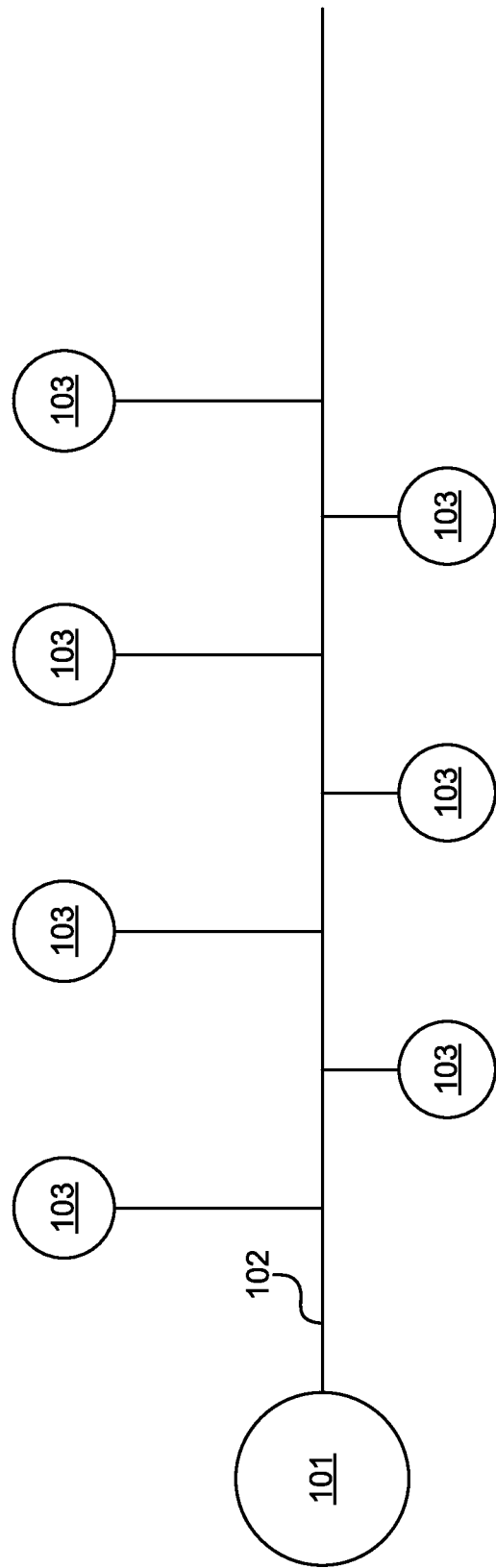
FIG. 1 illustrates an example of one environment in which some embodiments may be implemented.
Figure 2:
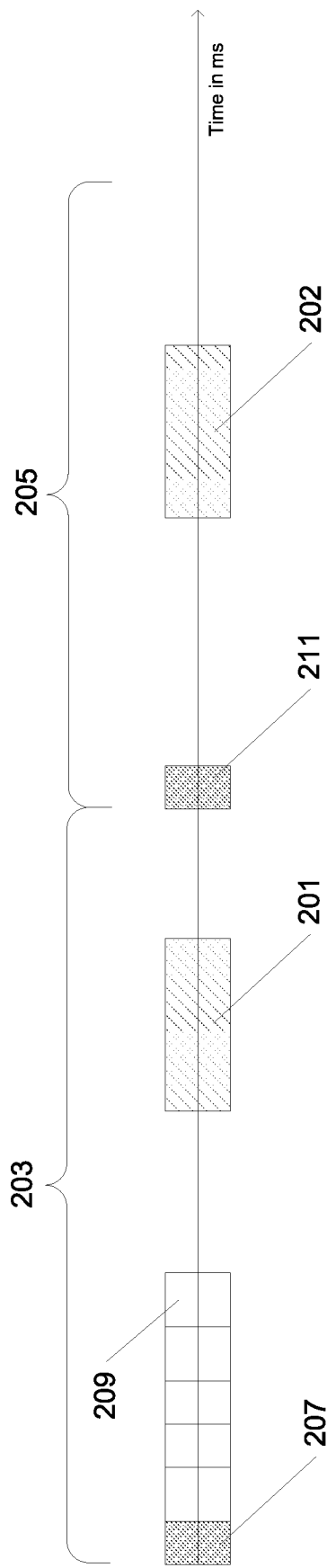
FIG. 2 is a timing diagram that illustrates the timing relationship between MAPs and MAP cycles according to certain embodiments.

The figures are not intended to be exhaustive or to limit the invention to the precise form disclosed. It should be understood that embodiments can be practiced with modification and alteration, and that the invention be limited only by the claims and the equivalents thereof.

DESCRIPTION

It may be desirable to increase the system capacity of an access network in many applications. For example, there is a strong demand for low cost per CPE networks and high network capacity in terms of throughput and number of users supported, especially in the China access market. For example, a single channel may be able to support an aggregate throughput of 180 Mbps. If this single channel is required to support, for example, 63 CPEs, however, the throughput per CPE drops to approximately 2.8 Mbps. Accordingly, it would be desirable to increase the number of channels utilized to increase capacity. For example, and following the above example, increasing from one to four channels, would theoretically increase aggregate throughput four times, from 180 Mbps to 720 Mbps, either for four times the number of CPEs to be supported, or for the same 63 CPEs with each CPE getting four times the throughput, according to the needs/wants of an OSP/MSO.

In order to increase the system capacity of an access network, while retaining backward compatibility, as alluded to above, a multi-channel system may be utilized. Conventional systems and methods relying on multiple channels are limited, though, by the need for a diplexer and a guard band to be implemented between neighboring channels, where the guard band and/or diplexer is typically required in order to reduce interference between such neighboring channels for time division duplex (TDD)-based access systems. However, the use of guard bands reduces spectral efficiency, as the guard band cannot be utilized for the actual transmission of signals. The use of diplexers increases the cost of implementing an access network, as well as increasing spectral waste. That is, to accommodate multiple devices on a given channel, a diplexer that includes a plurality of bandpass filters may be used to allow multiple signals in different frequency bands to share the same channel and filter out unwanted signals before providing the signal to a given device.

Accordingly, multi-channel access systems and methods are disclosed for synchronizing multiple channels that are configured to be contiguous, i.e., without a guard band between neighboring channels, and without utilizing diplexers. As a result, the available frequency spectrum can be optimized/used with increased efficiency. Each channel may include an NC and a number of CPEs. Each CPE, and each NC normally operate in a single channel, and to achieve high efficiency spectral usage, again, neighboring channels have a complete lack of a guard (gap) band. All of the NCs can operate in a coordinated manner in order to minimize mutual interference between multiple channels. It should be noted that various embodiments are herein disclosed in the context of a four-channel access network. However, the systems and methods described in the present disclosure can be utilized to support the use of any number of channels if desired.

Figure 3:
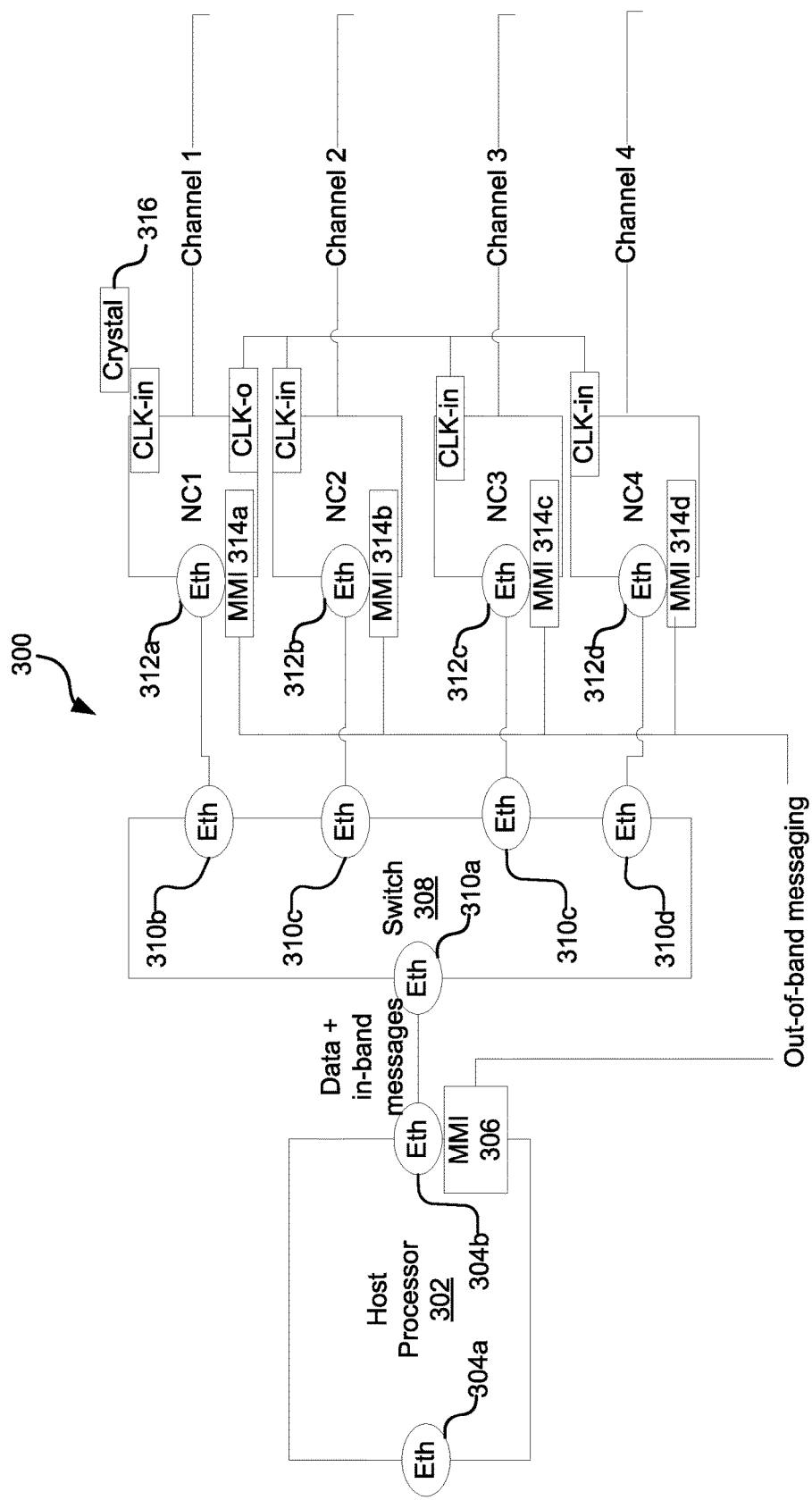
FIG. 3 illustrates a headend hardware platform for implementing some embodiments.

FIG. 3 illustrates an example headend hardware platform 300 in which various embodiments may be implemented. It should be noted that the corresponding CPE platform may be hosted or hostless.

The headend hardware platform 300 may include a host processor 302 with two Ethernet interfaces 304a, 304b, and a Media Independent Interface (MII) Management Interface (MMI). Host processor 302 can control various aspects of the access network in real-time. Ethernet interface 304a may be connected to a Wide Area Network (WAN) side (e.g., an optical network (ONT/ONU)), and Ethernet interface 304b may be connected to a Local Area Network (LAN) side, in this example, Ethernet switch 308 via an Ethernet interface 310a. Ethernet switch 308 may further include additional Ethernet interfaces 310b-310d, each of which may be connected to each NC (which can be implemented as a system-on-chip (SoC)) of an access channel. In the example illustrated in FIG. 3, four access channels are contemplated, each having a respective NC, i.e., NC1, NC2, NC3, and NC4, each of which have their own respective MMIs 314a, 314b, 314c, and 314d, as well as their own respective Ethernet interfaces 312a, 312b, 312c, and 312d.

In order to synchronize multiple channels in accordance with various embodiments, an efficient control messaging mechanism is implemented between host processor 302 and NC1, NC2, NC3, and NC4. In one embodiment, bidirectional messaging/communication may be performed using in-band messaging transmitted via an Ethernet connection. In the case of in-band messaging, for example, a sender can wrap a message in specialized Ethernet packets with a well-known single hop multicast MAC destination address, and send it as a regular multicast Ethernet packet along with, e.g., other regular data packets. The particular destination address can be utilized in order to let the receiver know to detect and open the specialized Ethernet packet, as it contains, e.g., control messaging. For DS messaging, e.g., from host processor 302, a well-known multicast destination address may be used, and Ethernet switch 308 may be configured to forward such DS messaging to all NCs, e.g., NC1, NC2, NC 3, and NC4. That is, IEEE 802.1 has defined the concept of a single-hop multicast MAC address, where an Ethernet packet with such a destination address is intercepted by a first receiving bridge, and processed/updated and then forwarded if needed. Each NC will filter out these messages from regular data packets. For US messaging, a multicast destination address may be used, and Ethernet switch 308 may be configured to forward the US messages to only host processor 302. In another embodiment, the functionalities of host processor 302 and Ethernet switch 308 may be combined and implemented in a single hardware element like an SoC.

It should be noted that a driver of host processor 302 can operate in a kernel mode (as opposed to a user mode) in order to handle these messages promptly.

In another embodiment, out-of-band messaging may be implemented via the respective MMIs of host processor 302 (MMI 306), and those of NC1, NC2, NC3, and NC4, i.e., MMIs 314a, 314b, 314c, and 314d, respectively. For example, MMI 306 of host processor 302 may act as a master that controls the MMIs, 314a-314d, of NC1-NC4. Each NC may be hardwired to a different PHY address, e.g., numbered from 0 to 3, through pin strapping, i.e. assigning a default (strapping) PHY address to each NC. Host processor 302 can then read/write to each NC's internal addressing space by selecting the appropriate PHY address assigned to an NC and register-based indirect addressing, i.e., the NC registers can be directly accessed to read/write. Such MMI-based control messaging can be used by host processor 302 to configure certain parameters (which will be discussed in greater detail below) in each NC quickly.

It should be noted that each NC can provide a watchdog that is monitored by host processor 302 (e.g., through periodic polling) to detect any malfunction of an NC. Host processor 302 may then be able to read/write channel-time-clock (CTC) values through the MMI, among other things. It should be further noted that in accordance with other embodiments, both in-band and out-of-band messaging may be utilized simultaneously, or as alternatives, e.g., out-of-band messaging may be used as a backup communication mechanism to in-band messaging.

As alluded to previously, a multi-channel access network may be achieved by synchronizing multiple channels. In one embodiment, the host processor ultimately defines the structure and synchronization of channels. Channel synchronization is described in the context of a four-channel access network, although various embodiments may be utilized to implement multi-channel access networks of other sizes/number of channels. Again, channel synchronization in accordance with various embodiments allows for the elimination or at least the minimization of interference between neighboring channels without the need for guard bands/diplexers between the neighboring channels.

Figure 4A:
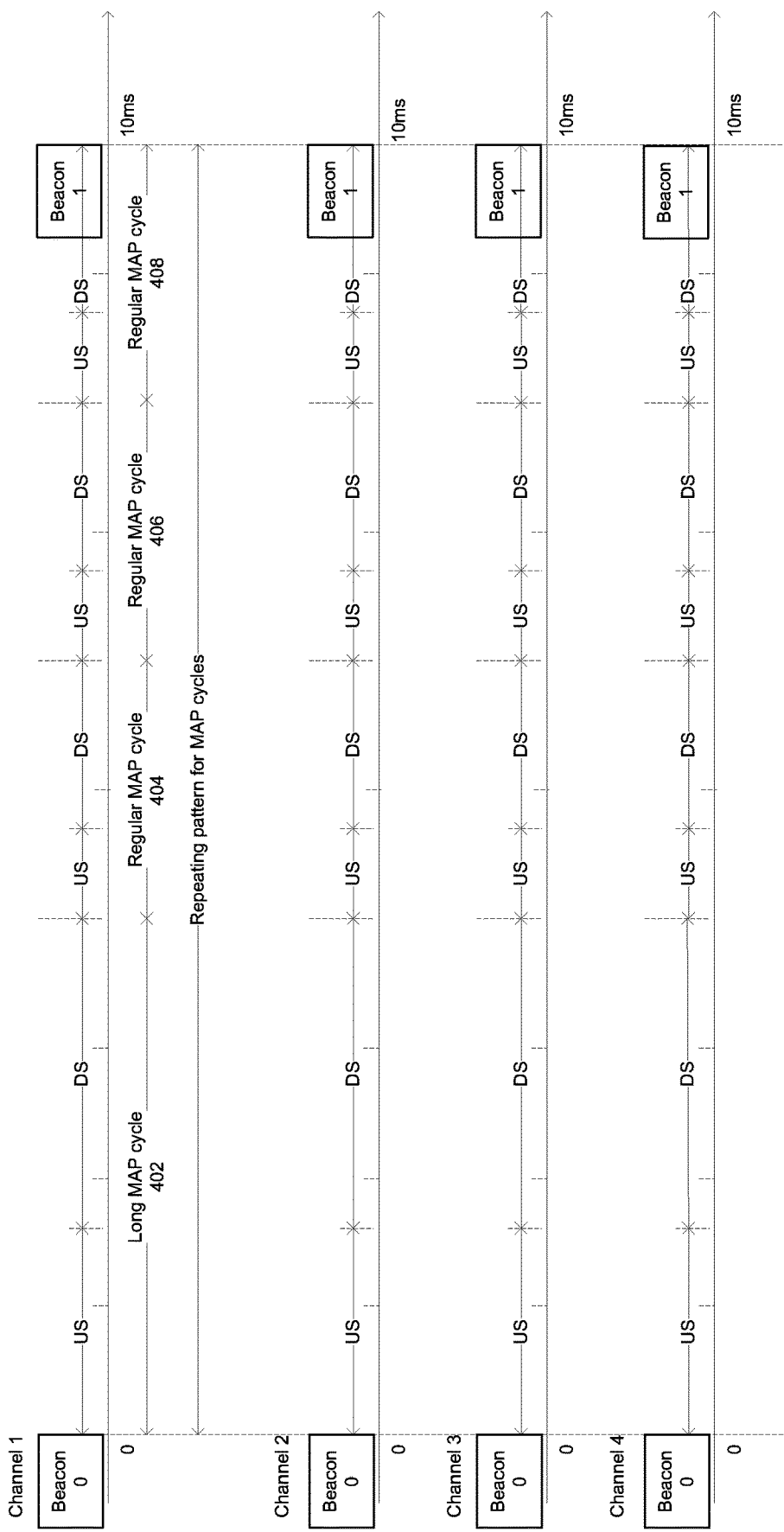
FIGS. 4A and 4B illustrate example synchronized multi-channel structures in accordance with some embodiments.

FIG. 4A illustrates an example of multi-channel synchronization in accordance with one embodiment. Channel access in the network (which can be, e.g., a c.LINK network) may be governed by a TDD scheme, where nodes transmit on the same frequency during different time slots which may be coordinated by the NC. In the example illustrated in FIG. 4A, NC1 of channel 1 may send out a beacon every 10 ms to allow, e.g., new nodes to join, synchronize, etc.

Per the TDD scheme, as described above, access to the medium may be controlled by the NC, and the NC can divide transmission time into units referred to as MAP cycles, each MAP cycle further being divided to accommodate Upstream (US) and Downstream (DS) traffic, as will be described in greater detail below. FIG. 4A illustrates an example in which channel 1 may be divided into a long MAP cycle 402, and three consecutive regular MAP cycles, 404, 406, and 408. These MAP cycles are repeated between beacon transmissions, with a beacon cycle (i.e., the time interval between two consecutive beacons) being typically fixed (e.g. c.LINK has a beacon interval of 10 ms). It should be noted that the number of MAP cycles, the arrangement/structure of MAP cycles between beacon transmissions, the allocation/division of US and DS traffic within each MAP cycle, the length of MAP cycles, can all vary in accordance with design/performance characteristics that may be desired in an access network.

Figure 4B:
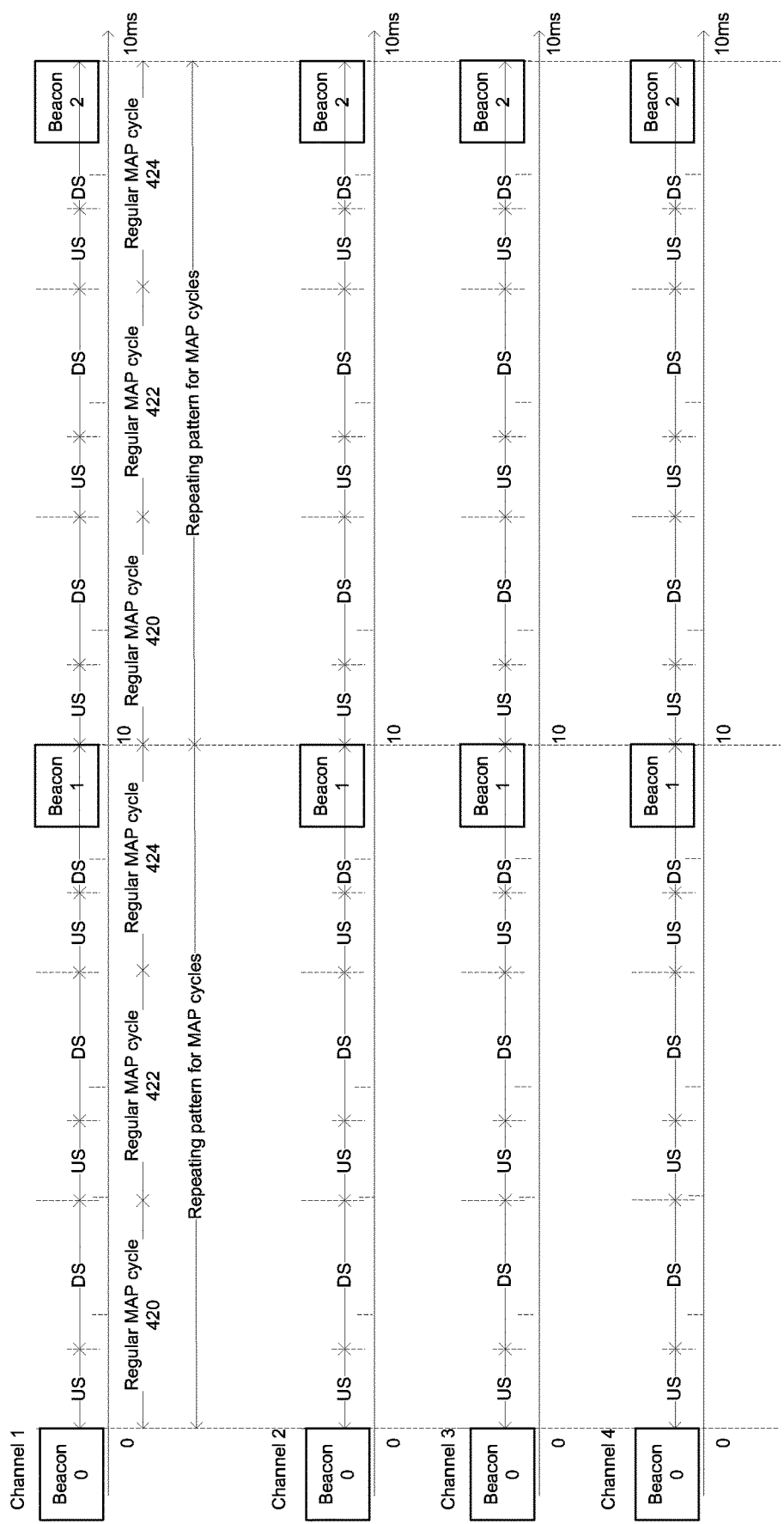

FIG. 4B, for example, illustrates an example channel scheme in accordance with another embodiment, where channel 1 may again transmit a beacon every 10 ms, but may have 3 regular MAP cycles, 420, 422, and 424, repeating between beacons. A long MAP cycle is not illustrated in the example of FIG. 4B, but may occur, e.g., every 4 beacon transmission, or not at all. It should be noted that long MAP cycles may be configured to accommodate certain, e.g., large transmissions that cannot be captured in a regular MAP cycle.

An important aspect to consider when minimizing inter-channel interference is removing the near-far problem in the access network. For example, considering that an access network is distributed over some area/space, with receivers and senders being located at different distances from each other, signal strengths may differ depending on whether data is being transmitted US or DS. To avoid the near-far problem, all channels, in this example, channels 1-4, are made to work in the same direction (US or DS) at any given time.

This can be realized, as illustrated in FIGS. 4A and 4B, by dividing each channel's MAP cycle into an US Cycle and a DS Cycle, and synchronizing all channels' MAP cycles, as well as the channels' beacons. That is, it can be appreciated that in the example illustrated in FIG. 4A, the beacons of channels 1-4 are all synchronized in time. Additionally, each of channels 1-4 have transmission time divided such that a long MAP cycle 402 occurs, followed by three regular MAP cycles 404, 406, and 408. Further still, each corresponding MAP cycle of each channel is divided into the same US and DS cycles.

During a US cycle, each of channels 1-4 can accommodate multiple CPEs, in one example, as alluded to previously up to 63 CPEs, and CPEs from different channels can transmit packets simultaneously. However, in a burst-based transmit system, for example, c.LINK, the burst length of each burst in each channel is typically variable and these bursts typically do not align with each other. If one CPE's radio frequency integrated circuit (RF IC) switches its state between transmit and receive, this will result in an impedance change on the medium, e.g., coax cable, thus disturbing ongoing packet transmission occurring on other channels.

Therefore, during a US cycle, each CPE's RF IC will be kept in the transmit state to keep the impedance of the coax cable constant. The noise produced by each silent CPE in the transmit state may be reduced by turning off some internal components of the RF IC. In other words, even if a CPE no longer has any packets to transmit, based on the synchronized MAP cycle structure, its state may still be maintained in transmit mode. Likewise, during each DS cycle, each receiver maintains its impedance on the coax cable until the DS cycle is complete.

Figure 5:
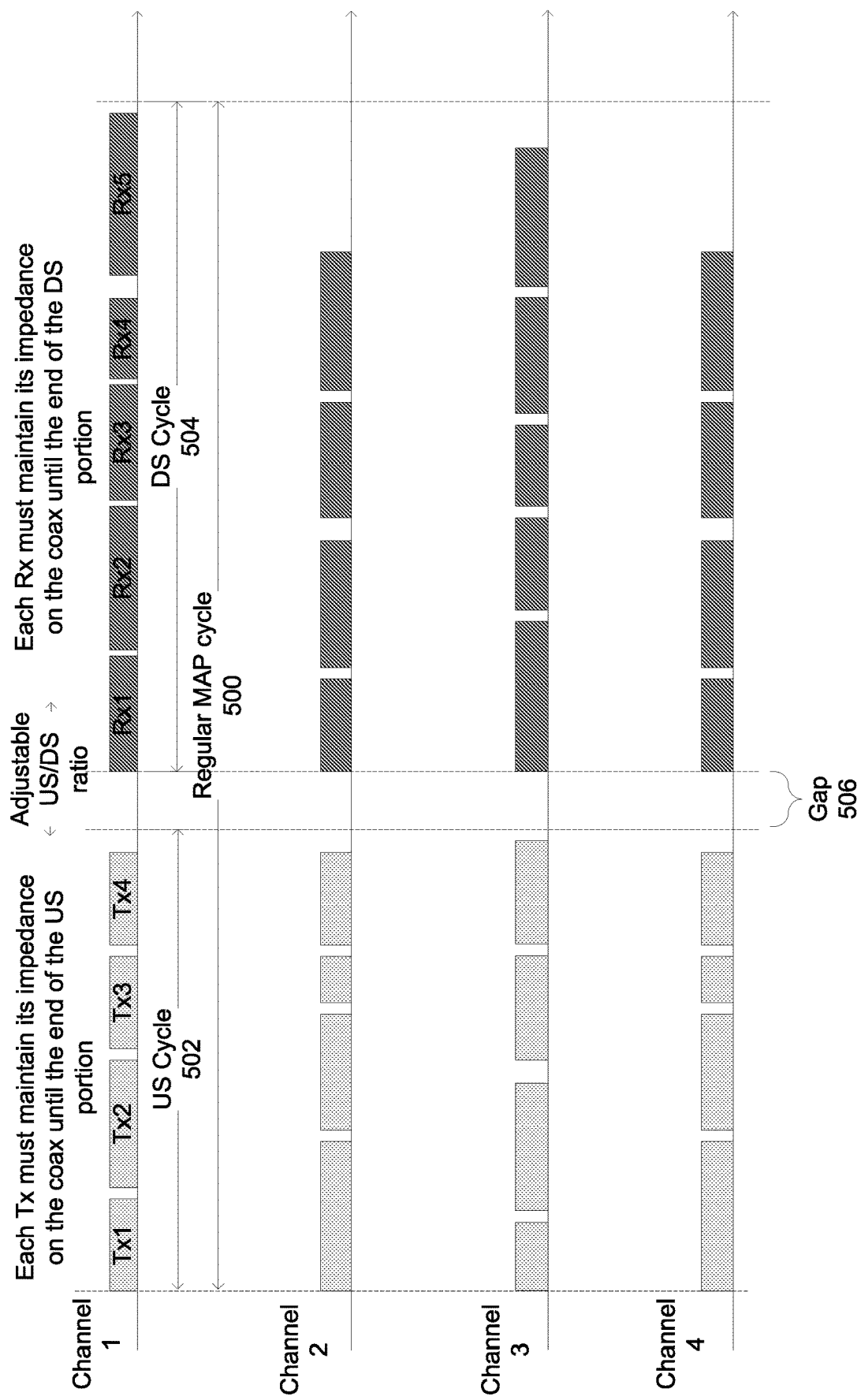
FIG. 5 illustrates an example timing diagram of US and DS cycles in a MAP cycle in accordance with some embodiments.

FIG. 5 illustrates an example of this transmit and receive state maintenance. In FIG. 5, a regular MAP cycle 500 is illustrated for channel 1. Regular MAP cycle 500 is divided into US cycle 502 and DS cycle 504 during which data packets can be transmitted to and received from, respectively, one or more CPEs. US cycle 502 is illustrated as including four transmissions (from one or more CPEs to their respective NC), Tx1, Tx2, Tx3, and Tx4, each transmission having a particular burst length that may not necessarily be constant between the transmissions. DS cycle 504 may include the receipt of five bursts (from the NC to one or more CPEs), Rx1, Rx2, Rx3, Rx4, and Rx5, each of which may also have different burst lengths. Each of channels 2-4 are illustrated as having their respective transmittals and receipt of bursts, the length and number of which may also vary from each other, and from those of channel 1. For example, four bursts are illustrated as being received over channels 2 and 4, while five bursts are received over channels 1 and 4. However, and as previously described, regardless of the actual transmit/receive conditions of a channel, each channel is maintained in the transmit state during the synchronized US cycles, and maintained in the receive state during the synchronized DS cycles to maintain constant impedance on the coax cable. A turnaround gap 506 can be introduced in order to allow for a channel to switch between transmit and receive states.

As described herein, one example of a channel configuration may utilize two fixed MAP cycle lengths, the long MAP cycle length and the regular MAP cycle length. The first MAP cycle after a fixed number of N beacons can use the long MAP cycle length, while all other MAP cycles use the regular MAP cycle length. One example configuration is as follows: a 10 ms beacon period, a regular MAP cycle length of 2 ms; and a Long MAP cycle length of 4 ms.

In an access network, network latency can mainly be determined by the access network size (i.e., the number of CPEs), the MAP cycle length, and the number of CPEs scheduled for each MAP cycle. In a 63 CPE access network, for example, 7 CPEs can be scheduled for each MAP cycle, and each CPE can be serviced once every 9 MAP cycles (63/7 CPEs=9 MAP cycles). A packet to be sent may be available just before it gets the opportunity to make the RR (shortest waiting time), or just after that opportunity (largest waiting time). Hence, in accordance with one embodiment, the waiting time variability can be the MAP cycle length of the MAP cycle in which the packet becomes available. After making the RR, the NC needs time to schedule it and send out the MAP packet containing the scheduled transmit time for the packet. This scheduling delay is variable but in average can be approximately 1.5 times the MAP cycle length. The remaining latency can be attributed to transmit time and receive path delay.

It should be noted that certain trade-offs can arise between the network latency, the MAP cycle lengths, the MAC throughput efficiency, and the number of RRs scheduled per MAP cycle. With all else being equal, the longer the MAP cycle lengths, the larger the network latency, and the more RRs are scheduled per MAP cycle, the larger the MAC overhead (for a non-saturated network, this can ultimately reduce the network latency).

As alluded to previously, and referring back to FIG. 3, host processor 302 can configure certain parameters in each NC quickly to ultimately achieve the synchronization of multiple channels in an access network. Such parameters can include (following the above example): regular MAP cycle length (default is 2 ms); long MAP cycle length (default is 4 ms); US to DS ratio for the regular MAP cycle length (default is 30% vs. 70%); US to DS ratio for the long MAP cycle length (default is 30% vs. 70%); and the number of beacons for each repeating pattern of MAP cycles (i.e. the number of beacon cycles for every long MAP cycle, if both long MAP cycle and regular MAP cycle are used; default is 1). Therefore, these parameters can be sent to the NCs, e.g., NC1, NC2, NC3, and NC4, from host processor 302 through in-band messaging and/or out-of-band messaging as previously described. Again, the above scenario is provided as a contextual example only, and other defaults, settings, parameters, etc. can be configured in accordance with other embodiments.

Figure 6:
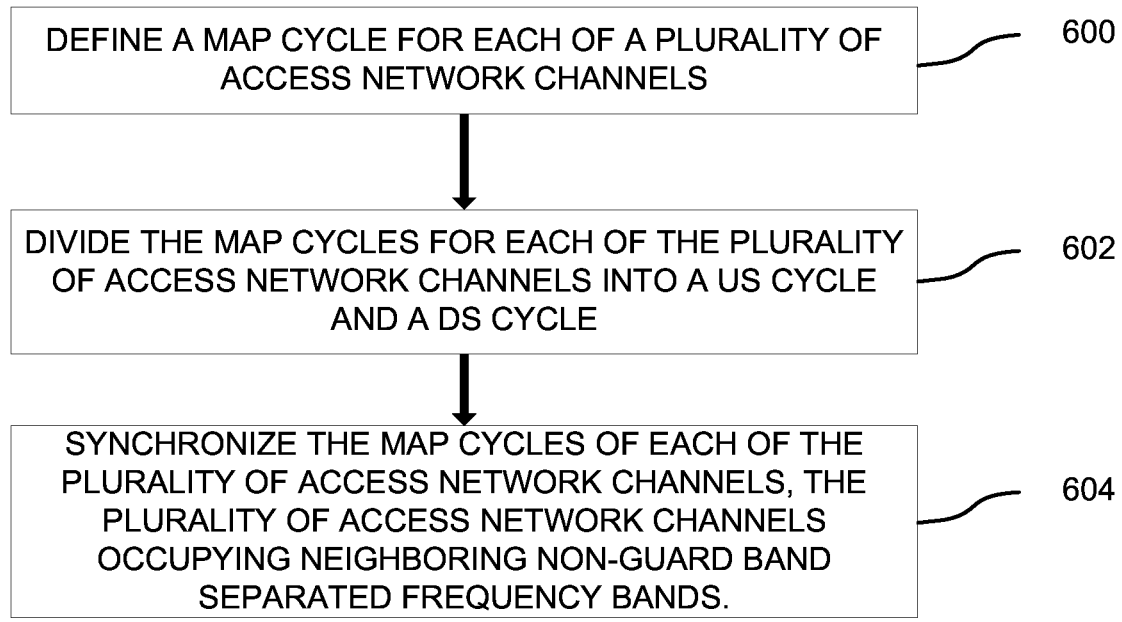
FIG. 6 illustrates example processes performed for synchronizing multiple channels in an access network in accordance with one embodiment.

FIG. 6 illustrates example processes that may be performed in accordance with various embodiments to synchronize multiple channels in an access network without a need for guard bands. At operation 600, MAP cycle is defined for each of a plurality of access network channels. As described herein, defining the MAP cycle can be accomplished by the host processor configuring various parameters in each NC. At operation 602, the MAP cycles for each of the plurality of access network channels are divided into a US cycle and a DS cycle. The division of the MAP cycle into US and DS cycles can involve dynamically adjusting the US and DS ratio as will be described in greater detail below. At operation 604, the MAP cycles of each of the plurality of access network channels are synchronized, the plurality of access network channels occupying neighboring non-guard band separated frequency bands.

Figure 7:
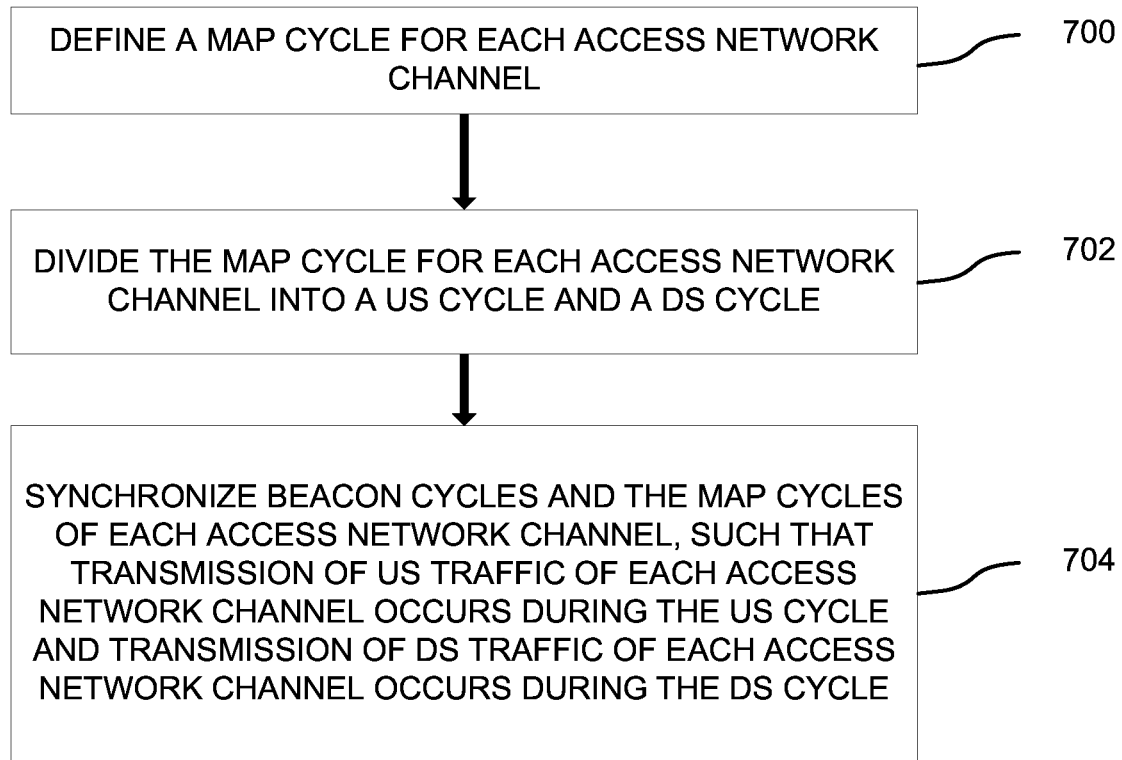
FIG. 7 illustrates example processes performed for synchronizing multiple channels in an access network in accordance with another embodiment.

FIG. 7 illustrates example processes that may be performed in accordance with various embodiments to synchronize multiple channels in an access network without a need for guard bands or to minimize the guard bands. At operation 700, a MAP cycle is defined for each access network channel. Again, defining the MAP cycle can be accomplished by the host processor configuring various parameters in each NC. At operation 702, the MAP cycle for each access network channel is divided into a US cycle and a DS cycle. The division of the MAP cycle into US and DS cycles can involve dynamically adjusting the US and DS ratio as will be described in greater detail below. At operation 704, beacon cycles and the MAP cycles of each access network channel are synchronized with each other, such that transmission of US traffic of each access network channel occurs during the synchronized US cycle and transmission of DS traffic of each access network channel occurs during the synchronized DS cycle.

As actual traffic on an access network typically changes over time, the ratio of US cycle to DS cycle within a MAP cycle (described above) can be adjusted. As would be understood, the access network may experience disparities regarding the amount of US and DS traffic at any given time. For example, at one point in time, a majority of CPEs may be receiving streaming media, and hence, DS traffic may be much greater than US traffic. Accordingly, an OSP/MSO may wish to adjust how much of a channel is allotted for US and DS traffic. The US to DS ratio can be adjusted either statically, by a network operator through a Network Management System, or preferably, dynamically, by the access network itself, via monitoring of conditions and condition changes of actual traffic.

To implement dynamic US-to-DS ratio adjustment, the host processor tracks DS traffic for bandwidth management purposes (as is described in greater detail below). For US traffic needs, each NC can be configured to report RRs from all CPES to the host processor. The host processor can therefore be aware of both DS and US traffic for each channel. For each CPE and for each channel, the host may build a moving average of N milliseconds for DS and US bandwidth requirements. From this, the host processor can determine an optimal ratio between the US cycle and the DS cycle of the MAP cycle, taking into account bitloading profiles in each direction.

Furthermore, the host processor may pass the US-to-DS ratio value to all the NCs, either through in-band messaging or out-of-band messaging, where in the in-band or out-of-band message, the host processor may also specify the CTC value after which the US-to-DS ratio is to take effect. Some advance time can be used in order to make sure all of the NCs use the new US-to-DS ratio value at the same time. This advance time should preferably be larger than the maximum latency that all NCs need to process the US-to-DS ratio message from the host processor. It should be noted that as described above, there can be two US-to-DS ratios, one US-to-DS ratio for the long MAP cycle, and another US-to-DS ratio for the regular MAP cycle, where the two US-to-DS ratios for the long and regular MAP cycles may be adjusted independently of each other.

As also described above, there may be instances when a node/CPE needs to transmit packets for a long duration (besides instances of mere packet aggregation), hence, the implementation of the long MAP cycle. During admission of a new CPE, the new CPE's admission report may take, e.g., a few hundred milliseconds. The I/Q profile probe, and the error vector magnitude (EVM) probe may each take around 200-400 μs. A disadvantaged CPE may have a bitloading profile as low as 18 Mbps, and therefore, a single 1518 byte packet may take 0.7 ms to transmit. In order to handle such packets, while maintaining flexibility the US-to-DS cycle ratio, and minimizing the potential bandwidth waste due to fixed cycle lengths, a repeating time structure, the long MAP cycle length for every M regular MAP cycle lengths can be adopted. Scheduling of such special packets listed can be performed in the long MAP cycle.

Further with regard to EVM probing, it should be understood that in an access network, a channel can have varying properties or other characteristics, and can also change over time. Accordingly, EVM probing can be performed to determine a channel's characteristics, after which proper modulation techniques can be selected to optimize the channel's performance. During EVM probing, neighboring channels should be transmitting at maximum power, in order for a CPE to obtain correct bitloading. That is, because in various embodiments, multiple channels are at issue, the worst-case scenario, i.e., when all channels are transmitting at maximum power, should be considered so that bits can be assigned efficiently. In accordance with one embodiment, all NCs may be instructed to send a DS EVM probe at the same time. The synchronization of the NCs' schedulers for the EVM probes can be done by fixing the EVM probe cycle, where an EVM probe can be performed every fixed number of beacon cycles (e.g., every 16 beacons), and allowing the host processor to instruct all the NCs when to do the EVM probing.

With a c.LINK unicast EVM probe, the channel's Cyclic Prefix (CP) for a specific node is used (as determined through an echo profile probe (EPP)). In accordance with various embodiments, the NC always uses maximum power for DS transmission, and EVM probing can be used by multiple (or even all) CPEs. All CPEs can be grouped into, e.g., 8 groups as a function of their CPs, where the range of CPs is assumed to be between 28 and 64, and this range is divided into 8 groups. All the CPEs within the same group share the same EVM probe from the NC which uses the group's CP. A group's CP may be considered to be the largest CPs of all the CPEs within the group. The CP step between groups is smaller at low CP and increases with CP value.

Another important aspect to consider in order to achieve synchronized channels, is synchronizing the clocks of each NC. Referring back to FIG. 3, NC1 is illustrated as having, e.g., a crystal oscillator 316, drive its internal clock producing a clock signal, CLK-in. NC1 further generates an output signal, CLK-o, off of which the respective CLK-in signals of each of NC2, NC3, and NC4 are keyed. That is, NC2, NC3, and NC4 utilize the CLK-o signal of NC1 as their CLK-in signal. As a result, NC1, NC2, NC3, and NC4 are effectively run with the same clock, so channel time, referred to as CTC, for each NC can remain aligned after an initial CTC synchronization process. This initial CTC synchronization process, to be described below, accounts for, e.g., different start/power up times of NC1, NC2, NC3, and/or NC4.

Channel establishment and CTC synchronization are yet another aspect to be considered. In accordance with one embodiment, an NC, e.g., NC2, NC3, or NC4, upon power up/startup, may search/snoop for the beacon of NC1 to obtain NC1's CTC, and synchronize its CTC to that of NC1's CTC (described above), after which it may move back to its assigned channel, i.e., channel 2, channel 3, and channel 4, respectively. At this point, each NC may begin operating/acting as the NC for its assigned channel. It should be noted that the channel frequency to which NC2, NC3, or NC4 is assigned may be obtained from its own non-volatile memory (as pre-programmed at the factory, for example) or from NC1. It should be further noted that NC 1 (which is aware it is the master NC) should be started first (obtaining its assigned channel frequency from its own pre-programmed non-volatile memory) and start its beacon to provide a reference for NC2-NC4 (which are aware they are not operating as a master NC). Additionally, NC2-NC4 need not perform an admission process into NC1's network.

In accordance with another embodiment, CTC synchronization can be achieved using hardware pins. NC1, acting as the master NC, may transmit its CTC directly to each of NC2, NC3, and NC4, using hardware pins or the aforementioned out-of-band messaging.

For a CPE, upon startup, the CPE may obtain its last operating channel (LOC) from its non-volatile memory, search and wait for that channel NC's beacons, and gain admittance. If the CPE is operative in Channel 1, NC1 may instruct the CPE to move to another channel if needed (e.g., for traffic/load balancing) and start the admission process to obtain admission to the assigned channel. It should be noted that a CPE moves from one channel to another during the turnaround gap time (as discussed in FIG. 5) between the US and DS cycles, to minimize any interference it may generate. That is, movement between channels can cause impedance changes. Accordingly, the move is preferably performed during the turnaround gap time in order to avoid alternating the coax cable impedance, which as previously described, can disturb ongoing packet transmissions.

In accordance with one embodiment, the four-channel access network described herein may utilize a 200 MHz spectral band, i.e., four contiguous channels, each channel having a 50 MHz bandwidth. This 200 MHz spectral band can be located anywhere in the coax plants, configurable by the network operator.

Continuing with the above example, the operating frequencies/channels of NC1, NC2, NC3, and NC4 may be pre-configured at the factory to work at from 975 MHz to 1175 MHz, while CPEs may be pre-configured at the factory to operate initially at 975 MHz. Hence, at first power up, a CPE may start to scan for NC1 at 975 MHz. Once admitted to the access network, the CPE may store its LOC so that upon future startups/resets, it can begin searching for a beacon at the stored LOC. As described above, each CPE may start up in either in channel 1 (i.e., the factory default), or in the LOC (at startups subsequent to the first/initial startup). If a CPE starts from channel 1, NC1 may admit the CPE to channel 1, and then either lets this CPE remain in channel 1, or instructs the CPE to move to another one of the three remaining channels, channel 2, channel 3, or channel 4. It should be noted that it is the host processor of the headend that instructs NC1 to in turn instruct the CPE to move to another channel. When the CPE moves to another channel, the NC of that channel admits the CPE as if it were a new node.

In order to allow the host processor (e.g., by way of an NC) to instruct a CPE to move to another channel if need be, in one embodiment, a messaging mechanism, can be established between an NC and a CPE. Upon receiving a request (instruction) to move to another channel, a CPE disconnects from its current channel/NC and moves to the requested channel, and starts the admission process with that channel's NC. It should be noted that it is also possible to preconfigure CPEs to always work in a specific channel in accordance with another embodiment.

The access network described herein may also account for dynamic channel assignment and channel load balancing to provide optimal/desired operating conditions. As described above, sending US traffic can involve a CPE making an RR to the NC of the channel upon which it is operating. The NC can pass this information onto the host processor for scheduling. In turn, the host processor is aware of all DS traffic as all DS traffic passes by the headend (i.e., the headend transmits all the downstream packets). Accordingly, the host processor is aware of what CPEs are operating on which channel, as well as the DS and US traffic in the access network. Hence, the host processor can act to achieve the aforementioned load balancing, and if needed, dynamic channel assignment. It should be noted that as described in FIG. 3, out-of-band and/or in-band messaging via MMI of Ethernet packets can be utilized in order to allow the host to receive such information, and pass instructions to NCs and/or CPEs.

Each channel can be designed to have up to 63 CPEs, in the example described herein, although a channel can be designed to operate with varying numbers of CPEs. Depending on number of active nodes (CPEs) on each channel, as well as the bandwidth usage of each active node, the load on the entire access network may be not balanced, e.g., some channels may be heavily loaded while other channels may be idling. It is thus desirable to be able move CPEs from one channel to another, depending on, e.g., current traffic load conditions. However, in order not to disturb any ongoing applications, CPEs may be moved from one channel to another channel according to a particular order in accordance with one embodiment. That order is as follows: first, move only newly admitted CPEs; second, move those CPEs with minimum (which can be some pre-determined threshold) traffic.

As alluded to previously, the load conditions on all channels of the access network can be analyzed by the host processor. For DS traffic from the WAN side, the host processor already has information, such as packet destination, packet size, and Quality of Service (QoS) requirements. For US traffic from CPEs, the NC of each channel is required to assemble all the RRs from all CPEs on its channel, and make them available to the host processor through the control messaging packets (i.e., via in-band or out-of-band messaging). The host processor can therefore, see the needs of CPEs for US transmission. The host processor can also then determine both the need for DS bandwidth and the need for US bandwidth for each channel. These needs are tracked continuously over the operation time of the access network, and the host processor can then determine when to move certain CPEs from one channel to another, and to/from which channel. Such decisions are communicated to the NCs which in turn instructs the corresponding CPEs running on its access network to move to another channel.

For the headend, the host processor can control the booting process. The host process can be configured with a Flash where booting images for all NCs are stored. At power-up, the host process can first boot itself. Then, the host processor can boot the NC of channel 1 by writing the corresponding code image to the NC. The host process may then proceed to booting subsequent channel NCs until all NCs in the access network have been booted up.

As described above, each NC can provide a watchdog which is monitored by the host processor (e.g., through periodic polling) to detect any malfunction of an NC. Such a watchdog may be implemented as a software counter that counts the number of beacons it has counted since power-up of the NC. This counter value can be stored in a predefined memory space accessible to the host processor. The host processor may then periodically pull a watchdog in order to determine if the NC is still running correctly. In case of NC failure, the host processor can reset the NC, and record any failures in its management information base (MIB), and report to the central office through the aforementioned Network Management System.

In one embodiment, a CPE that has been trying to gain admission into, e.g., channel 2, 3 or 4, but has failed can revert to channel 1 after some predetermined period of time has passed, e.g., 15 minutes.

Figure 8:
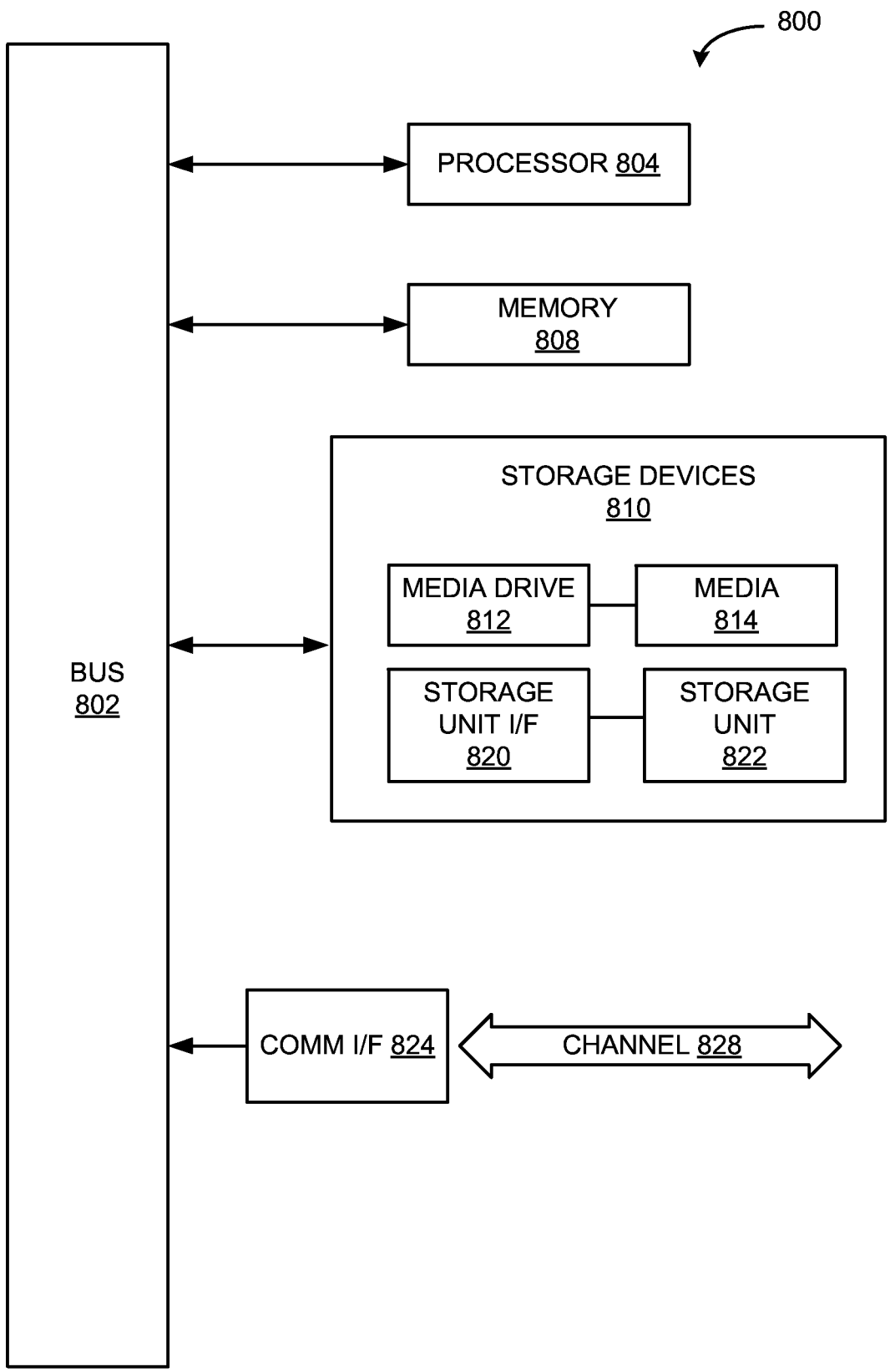
FIG. 8 illustrates an example computing module that may be used in implementing various features of embodiments.

FIG. 8 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

Referring now to FIG. 8, computing module 800 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A platform comprising:
    a plurality of access network channels; and
    a processor operable to:
        generate a Media Access Plan (MAP) cycle for each of the plurality of access network channels, wherein the MAP cycle comprises an upstream cycle and a downstream cycle, and
        synchronize the MAP cycle for each of the plurality of access network channels such that the upstream cycle for any of the plurality of access network channels does not occurs during the downstream cycle for any of the plurality of access network channels.

2. The platform of claim 1, wherein the synchronized MAP cycles comprise a repeating pattern comprising a regular MAP cycle and a long MAP cycle, the length of the long MAP cycle exceeding that of the regular MAP cycle.

3. The platform of claim 2, wherein the platform is operable to divide the MAP cycle for each of the plurality of access network channels into an upstream cycle and a downstream cycle by defining an upstream to downstream cycle ratio for each of the regular MAP cycle and the long MAP cycle, and to determine the upstream cycle and the downstream cycle based on the defined ratio.

4. The platform of claim 1, wherein the platform is communicatively coupled to a plurality of customer premises equipment (CPE), the CPEs being operable to:
    maintain a transmit state impedance of each of said CPEs operating on the access network channels during the upstream cycle, both when transmitting and when not transmitting; and
    maintain a receive state impedance of each of said CPEs operating on the first and additional access network channels during the downstream cycle, both when receiving and when not receiving.

5. The platform of claim 1, wherein:
    the platform comprises a plurality of network controllers, each of plurality of the network controllers corresponding to a respective one of the access network channels; and
    the platform is operable to synchronize clock signals, channel timer counters, and beacon signals utilized by the network controllers.

6. The platform of claim 1, wherein:
    the platform comprises a plurality of network controllers, each of the plurality of network controllers corresponding to a respective one of the access network channels;
    a first network controller of the plurality of network controllers corresponds to a first access network channel of the access network channels and is operable to transmit a first beacon on the first access network channel; and
    a second network controller of the plurality of network controllers corresponds to a second access network channel of the access network channels and is operable to synchronize a channel timer counter of the second network controller by tuning to the first access network channel to listen to the first beacon; and a third network controller of the plurality of network controllers corresponds to a third access network channel of the access network channels and is operable to synchronize a channel timer counter of the third network controller by tuning to the first access network channel to listen to the first beacon.

7. The platform of claim 1, wherein:
the platform comprises a plurality of network controllers, each of the network controllers corresponding to a respective one of the access network channels;
the platform is communicatively coupled to a customer premises equipment (CPE), and
the CPE is operable to, upon startup, attempt to gain admission to a first access network channel of the plurality of access network channels by scanning for a beacon transmitted by a first network controller of the plurality of network controllers.

8. The platform of claim 1, wherein:
the platform comprises a plurality of network controllers, each of the network controllers corresponding to a respective one of the access network channels;
the platform is communicatively coupled to a customer premises equipment (CPE), and
the CPE is operable to, until the CPE is admitted onto the access network, sequentially scan for a beacon transmitted by a respective network controller of each of the access network channels.

9. The platform of claim 8, wherein the CPE is operable to store a channel frequency associated with an access network channel over which the CPE gains admission to the access network.

10. The platform of claim 8, wherein:
the platform is operable to provide a turnaround gap period which is free of any transmissions; and
the CPE is operable to move from a first of the access network channels to a second of the access network channels during the turnaround gap period.

11. A platform comprising:
a processor; and
a plurality of access network channels,
wherein the platform is operable to:
generate a Media Access Plan (MAP) cycle, for each of the plurality of access network channels, comprising an upstream cycle and a downstream cycle; and
synchronize beacon cycles and the MAP cycle of each of the access network channels, such that transmission of upstream traffic of each of the access network channels occurs during the upstream cycle and transmission of downstream traffic of each of the access network channels occurs during the downstream cycle, wherein the synchronizing comprises transmitting information describing the synchronizing to a respective network controller of each of the access network channels.

12. The platform of claim 11, wherein the synchronized MAP cycles comprise a repeating pattern comprising a regular MAP cycle and a long MAP cycle, the length of the long MAP cycle exceeding that of the regular MAP cycle.

13. The platform of claim 12, wherein the platform is operable to divide the MAP cycle for each of the plurality of access network channels into an upstream cycle and a downstream cycle by defining an upstream to downstream cycle ratio for each of the regular MAP cycle and the long MAP cycle, and to determine the upstream cycle and the downstream cycle based on the defined ratio.

14. The platform of claim 11, wherein:
the platform comprises a plurality of network controllers, each of the plurality of network controllers corresponding to a respective one of the access network channels; and
the platform is operable to synchronize clock signals, channel timer counters, and beacon signals utilized by the network controllers.

15. The platform of claim 11, wherein the platform is communicatively coupled to a plurality of customer premises equipment (CPE), the CPEs being operable to:
maintain a transmit state impedance of each of said CPEs operating on the access network channels during the entire upstream cycle, both when transmitting and when not transmitting; and
maintain a receive state impedance of each of said CPEs operating on the first and additional access network channels during the entire downstream cycle, both when receiving and when not receiving.

16. The platform of claim 11, wherein:
the platform comprises a plurality of network controllers, each of the plurality of network controllers corresponding to a respective one of the access network channels;
the platform is communicatively coupled to a customer premises equipment (CPE), and
the CPE is operable to, upon startup, attempt to gain admission to a first access network channel of the plurality of access network channels by scanning for a beacon transmitted by a first network controller of the plurality of network controllers.

17. The platform of claim 11, wherein:
the platform comprises a plurality of network controllers, each of the plurality of network controllers corresponding to a respective one of the access network channels;
the platform is communicatively coupled to a customer premises equipment (CPE), and
the CPE is operable to, until the CPE is admitted onto the access network, sequentially scan for a beacon transmitted by a respective network controller of each of the access network channels.

18. The platform of claim 17, wherein the CPE is operable to store a channel frequency associated with an access network channel over which the CPE gains admission to the access network.

19. The platform of claim 11, wherein:
the platform comprises a plurality of network controllers, each of the plurality of network controllers corresponding to a respective one of the access network channels;
a first network controller of the plurality of network controllers corresponds to a first access network channel of the access network channels and is operable to transmit a first beacon on the first access network channel; and
a second network controller of the plurality of network controllers corresponds to a second access network channel of the access network channels and is operable to synchronize a channel timer counter of the second network controller by tuning to the first access network channel to listen to the first beacon; and
a third network controller of the plurality of network controllers corresponds to a third access network channel of the access network channels and is operable to synchronize a channel timer counter of the third network controller by tuning to the first access network channel to listen to the first beacon.

20. The platform of claim 11, wherein:
- the platform comprises a plurality of network controllers, each of the plurality of network controllers corresponding to a respective one of the access network channels;
- a first network controller of the plurality of network controllers corresponds to a first access network channel of the access network channels and is operable to transmit a first beacon on the first access network channel; and
- a second network controller of the plurality of network controllers corresponds to a second access network channel of the access network channels and is operable to synchronize a channel timer counter of the second network controller by communicating with the first network controller, either through hardware pins, or a media independent interface management interface.

* * * * *